United States Patent
Tkadlec

(10) Patent No.: US 12,249,869 B1
(45) Date of Patent: Mar. 11, 2025

(54) PERMANENT MAGNET ELECTRIC MOTOR

(71) Applicant: Variant Motion Inc., Oakdale, MN (US)

(72) Inventor: Michael G. Tkadlec, Oakdale, MN (US)

(73) Assignee: Variant Motion Inc, Oakdale, MN (US)

( * ) Notice: Subject to any disclaimer, the term of this patent is extended or adjusted under 35 U.S.C. 154(b) by 293 days.

(21) Appl. No.: 17/720,283

(22) Filed: Apr. 13, 2022

Related U.S. Application Data

(60) Provisional application No. 63/174,660, filed on Apr. 14, 2021.

(51) Int. Cl.
*H02K 1/27* (2022.01)
*H02K 1/17* (2006.01)
*H02K 53/00* (2006.01)

(52) U.S. Cl.
CPC ................ *H02K 1/17* (2013.01); *H02K 1/27* (2013.01)

(58) Field of Classification Search
CPC ............ H02K 53/00; H02K 1/17; H02K 1/27; H02K 1/276; H02K 16/00; H02K 16/02; H02K 49/00; H02K 49/10; H02K 49/102; H02K 49/106; H02K 51/00; H02K 11/01; H02K 11/012; H02K 11/014; H02K 2201/03; H02K 2201/06; H02K 3/47
USPC .......................................................... 310/156
See application file for complete search history.

(56) References Cited

U.S. PATENT DOCUMENTS

| | | | |
|---|---|---|---|
| 687,292 A | 11/1901 | Armstrong | |
| 750,009 A | 1/1904 | Thordon | |
| 1,863,294 A | 6/1932 | Francis | |
| 7,385,325 B2 | 6/2008 | Tkadlec | |
| 7,777,377 B2 | 8/2010 | Tkadlec | |
| 8,084,904 B2 | 12/2011 | Tkadlec | |
| 8,519,584 B2 | 8/2013 | Tkadlec | |
| 9,118,221 B2 | 8/2015 | Tkadlec | |
| 2013/0033136 A1* | 2/2013 | McMullen | H02K 7/025 310/90.5 |
| 2016/0294230 A1* | 10/2016 | Zhang | H02K 21/44 |
| 2020/0028389 A1* | 1/2020 | Long | H02K 15/00 |
| 2021/0036595 A1* | 2/2021 | Imanishi | H02K 49/10 |

FOREIGN PATENT DOCUMENTS

| | | | | |
|---|---|---|---|---|
| KR | 20090127116 A | * | 12/2009 | ............ H02K 21/00 |
| KR | 20170058627 A | * | 5/2017 | |

OTHER PUBLICATIONS

Machine Translation for KR 20090127116 A (Year: 2009).*
Machine Translation of KR_20170058627_A (Year: 2017).*

* cited by examiner

*Primary Examiner* — Quyen P Leung
*Assistant Examiner* — Charlie Frank Mann, Jr.
(74) *Attorney, Agent, or Firm* — Lund IP, PLLC

(57) ABSTRACT

An electric motor includes a central shaft, a rotor configured to rotate about the central shaft, wherein the rotor includes a plurality of rotor permanent magnets arranged with a first polar orientation relative to the central shaft, a stator arranged proximate to the rotor. The stator includes a plurality of stator permanent magnets arranged in a second polar orientation relative to the central shaft, wherein the plurality of stator permanent magnets are oriented to repel the rotor permanent magnets, and a plurality of magnetic interruption devices (MIDs) corresponding to the plurality of stator permanent magnets.

27 Claims, 14 Drawing Sheets

PERMANENT MAGNET ELECTRIC MOTOR

RELATED APPLICATION

This application claims the benefit of and priority to U.S. Provisional Application No. 63/174,660, filed Apr. 14, 2021, which is hereby incorporated by reference.

TECHNICAL FIELD

This disclosure relates to electric motors.

BACKGROUND

Electric motors include a stator, a rotor, a field magnet, and an armature. Often, the rotor includes a rotating field magnet, while the armature is stationary, and is part of the stator. Both motors and generators can be built either with a stationary armature and a rotating field or a rotating armature and a stationary field. In common electric motors, voltage is proportional to speed (or RPM) and amperage is proportional to torque (or power). A motor converts electrical energy into mechanical energy, whereas a generator does the opposite.

BRIEF SUMMARY

Electric motors disclosed herein may include stators with permanent stator magnets to drive rotation combined with magnetic interruption devices (MIDs). MIDs are configured to interrupt the magnetic fields of the permanent magnets to allow a rotor magnet to approach the permanent magnets. In another aspect, electric motors described include modular rotors and stators that may be stacked in series along a common axis to facilitate a variety of motor/generator capacities using common components.

In one example, an electric motor includes a central shaft, a rotor configured to rotate about the central shaft, wherein the rotor includes a plurality of rotor permanent magnets arranged with a first polar orientation relative to the central shaft, a stator arranged proximate to the rotor. The stator includes a plurality of stator permanent magnets arranged in a second polar orientation relative to the central shaft, wherein the plurality of stator permanent magnets are oriented to repel the rotor permanent magnets, and a plurality of magnetic interruption devices (MIDs) corresponding to the plurality of stator permanent magnets.

Related patents by the same inventor include U.S. Pat. Nos. 7,385,325, 7,777,377, 8,084,904, 8,519,584, and 9,118,221, each of which is incorporated by reference herein in its entirety.

BRIEF DESCRIPTION OF THE DRAWINGS

FIGS. 6A and 6B illustrate magnetic fields of adjacent permanent magnets in the stator-rotor pair of the electric motor of FIGS. 1A-1D with a soundwave MID off and on.

DETAILED DESCRIPTION

Figure 1A:
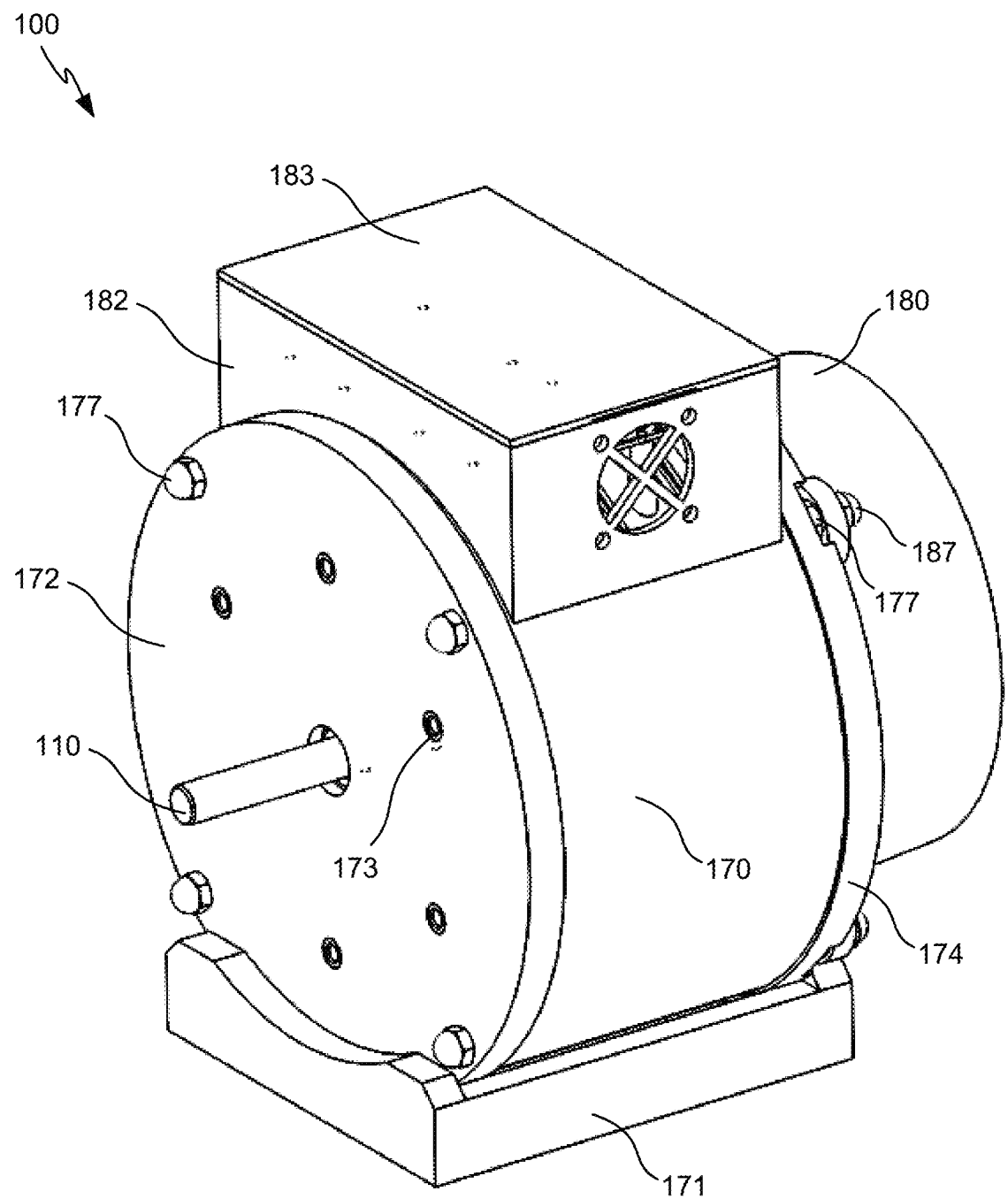
FIGS. 1A-1D illustrate a modular electric motor including stators with permanent magnets to drive rotation and magnetic interruption devices (MIDs) including electromagnetic coils configured to interrupt the magnetic fields of the permanent magnets.

FIGS. 1A-1D illustrate a modular electric motor 100 including stators 130 with permanent magnets 132 to drive rotation and magnetic interruption devices (MIDs) 190 including electromagnetic coils configured to interrupt the magnetic fields of the permanent magnets 132. Electric motor 100 further includes rotors 120 with permanent magnets 122. Unlike other electrical motors, the electric motor 100 does not rely on the wound coils to produce speed and torque. Although increasing or decreasing voltage changes the speed of the electric motor 100, it is the amount of time that the MIDs 190 are powered which creates the primary differential in speed. Torque is supplied by the interactions of the natural magnetic fields between rotor magnets 122 and stator magnets 132.

Figure 1B:
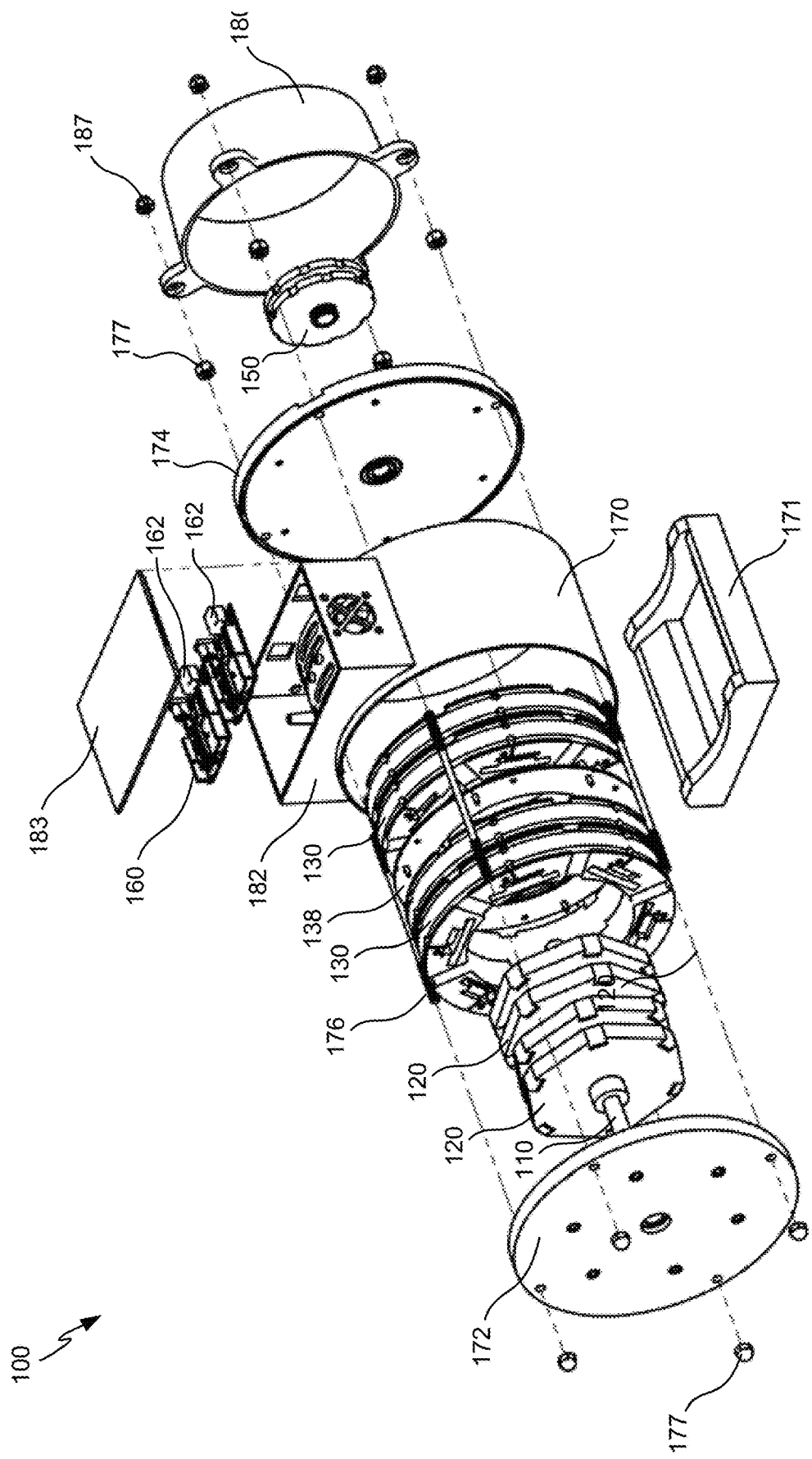
Figure 1C:
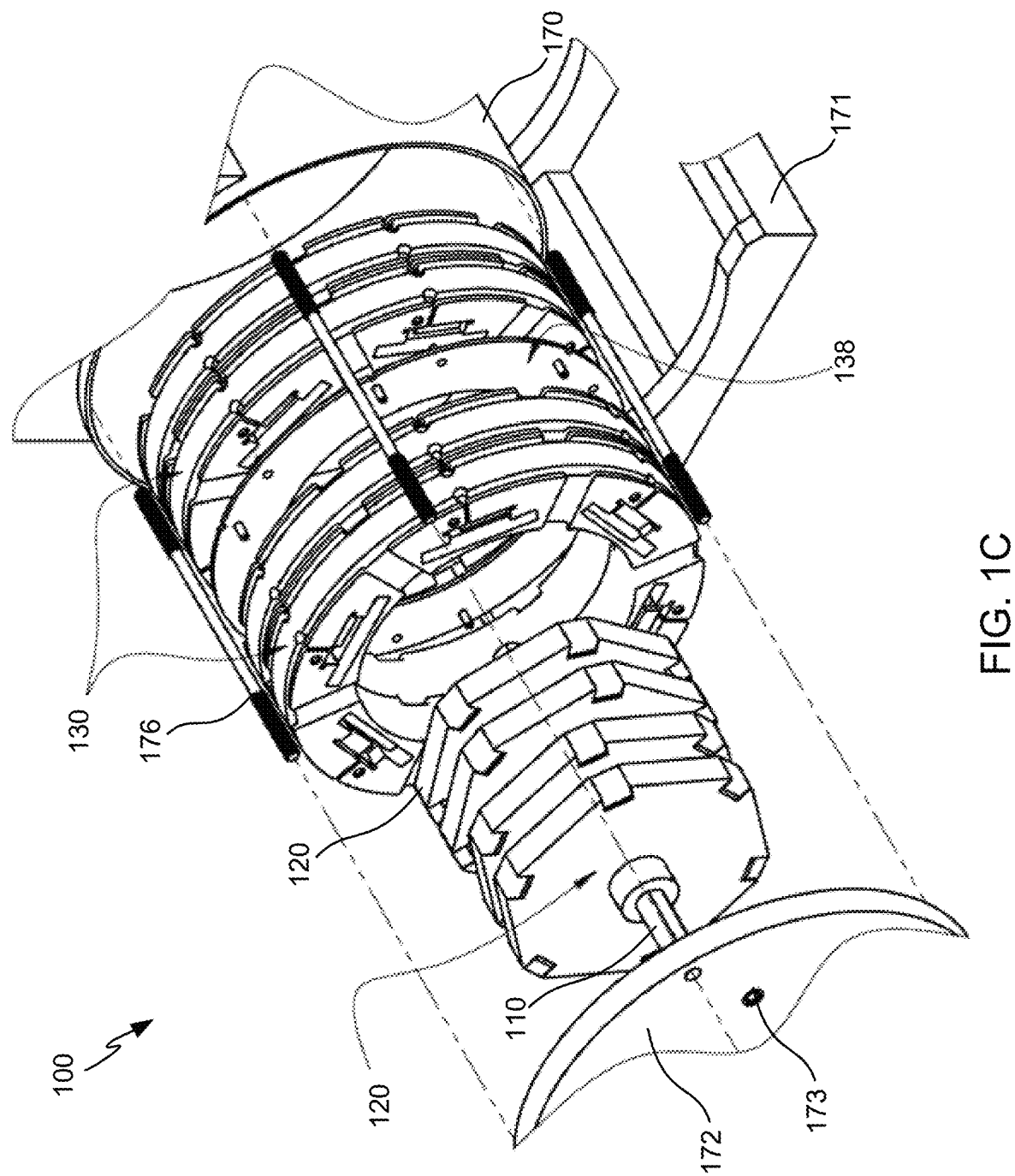
Figure 1D:
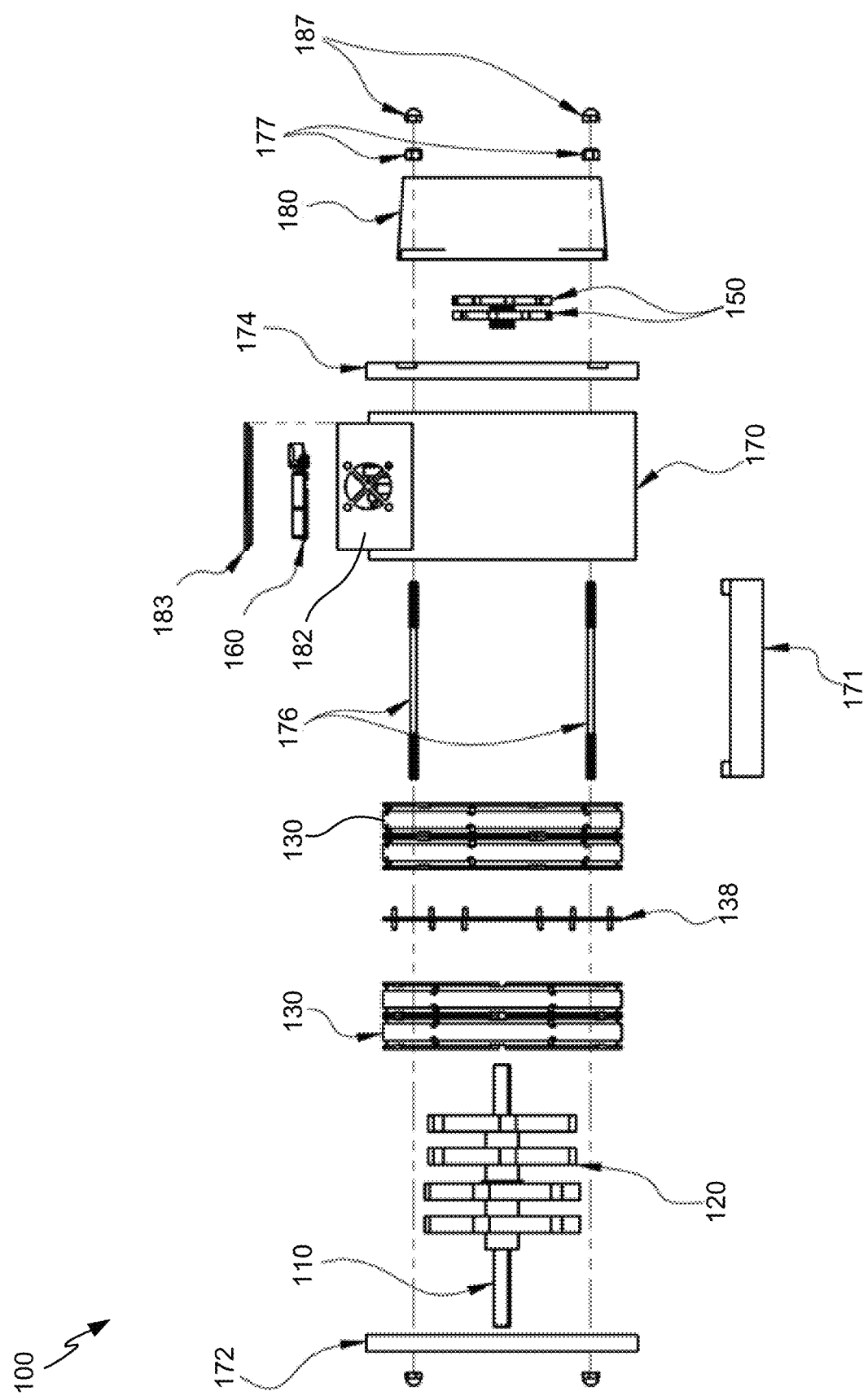
Figure 2:
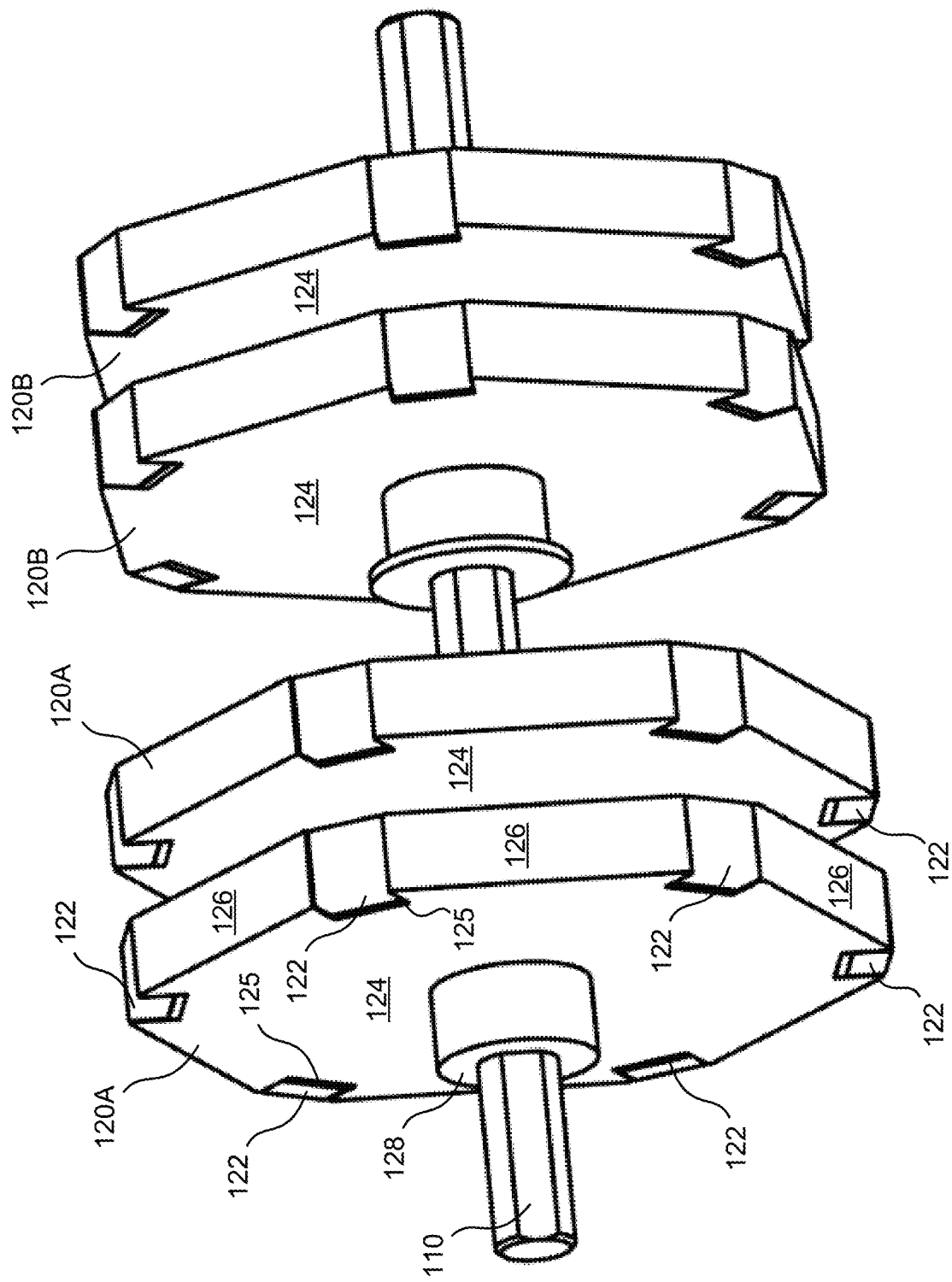
FIG. 2 illustrates a set of rotors of the electric motor of FIGS. 1A-1D, the rotors including permanent magnets.
Figure 3:
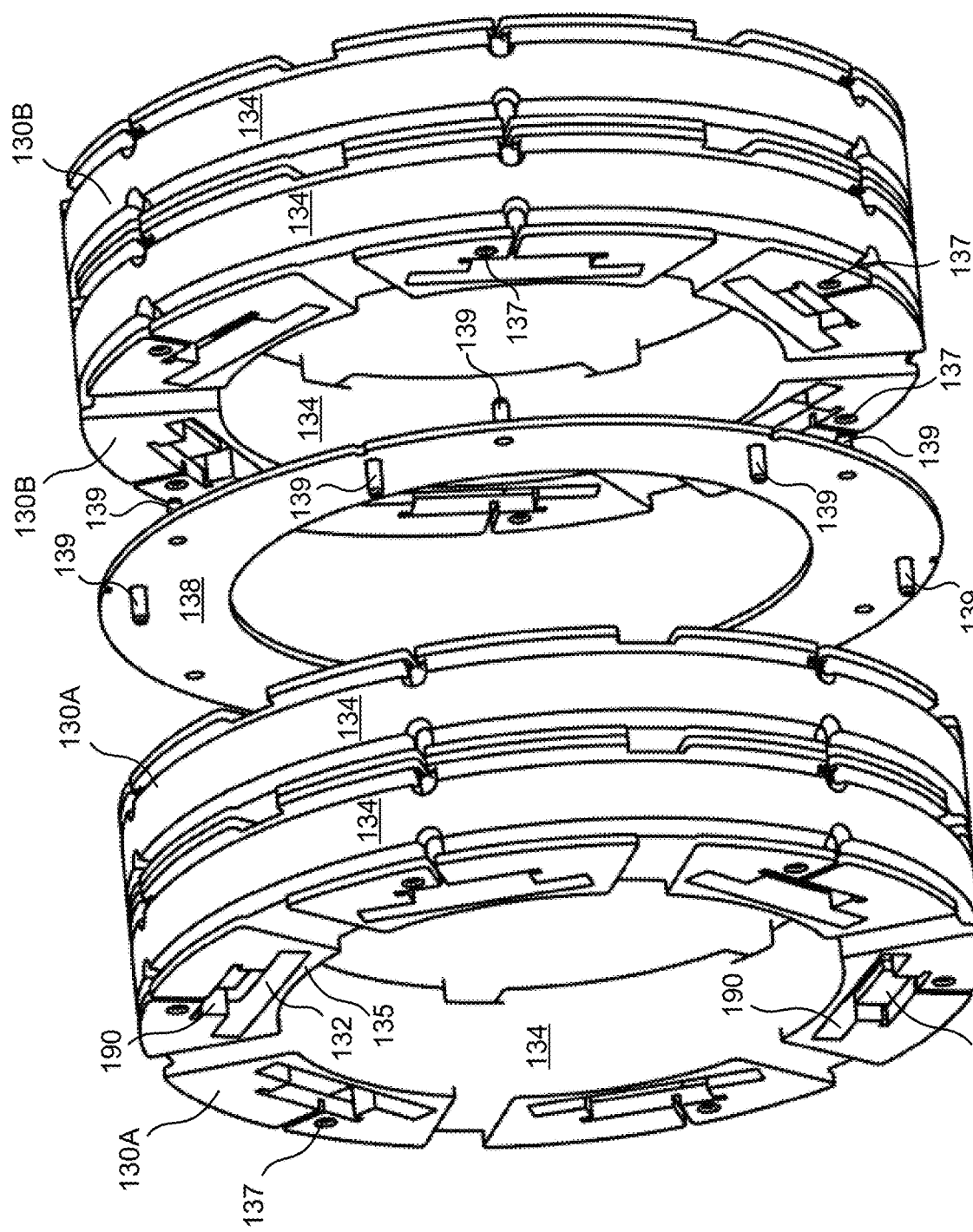
FIG. 3 illustrates a set of stators of the electric motor of FIGS. 1A-1D, the stators including permanent magnets and MIDs including electromagnetic coils configured to interrupt the magnetic fields of the permanent magnets.

Specifically, FIG. 1A is an isometric view of electric motor 100, FIG. 1B is an exploded isometric view of electric motor 100, FIG. 1C is an exploded isometric view of including rotors 120 and stators 130, and FIG. 1D is side exploded view of electric motor 100. In addition, FIG. 2 illustrates the set of rotors 120 for motor 100, and FIG. 3 illustrates a set of stators 130 for motor 100. Base 171 supports motor 100 during testing.

Electric motor 100 includes a central shaft 110, a rotor 120 configured to rotate about the central shaft 110. The rotor 120 includes a plurality of rotor permanent magnets 122 arranged with a first polar orientation relative to the central shaft 110, and a stator 130 arranged proximate to the rotor 120. Similarly, the stator 130 includes a plurality of stator permanent magnets 132 arranged in a second polar orientation relative to the central shaft 110. The plurality of stator permanent magnets 132 are oriented to repel the rotor permanent magnets 122.

The stator 130 further includes a plurality of magnetic interruption devices (MIDs) 190 corresponding to the plurality of stator permanent magnets 132. The stator 130 further includes a stator frame 134, forming a plurality of slots 135 (FIG. 3) configured to hold the plurality of stator permanent magnets 132 and MIDs 190 arranged in the second polar orientation. An inner diameter of stator frame 134 is sized to receive a rotor 120 with minimal spacing between the outer edges of permanent magnets 122 and the inner diameter of stator frame 134.

In some examples, permanent magnets 122 may include rare earth magnets, ferromagnets and/or electromagnets. In the same or different examples, permanent magnets 132 may include rare earth magnets, ferromagnets and/or electromagnets.

The rotor 120 further includes a rotor frame 124, wherein the rotor frame 124 includes a keyed central aperture engaged with the central shaft 110, and a plurality of slots 125 (FIG. 3) configured to hold the plurality of rotor permanent magnets 122 arranged in the first polar orientation. Rotor frame 124 includes six slots 125, which are positioned at the apexes between the six flat side surfaces 126. Each rotor frame includes a setscrew (not shown) engaging keyed shaft 110. A front main bearing hub 128 supports shaft 110 through front plate 172.

In some examples, each MID 190 includes a conductive material configured to, in response to an electric current, generate an MID electric field to counteract an electric field of the corresponding stator permanent magnet 132. For example, each MID 190 may include an electromagnetic coil oriented to counteract the electric field of the corresponding stator permanent magnet 132. In some examples, the electric motor 100 is configured to receive an AC input power for driving the electric current to the MIDs 190. In other examples, the electric motor 100 is configured to receive a DC input power for driving the electric current to the MIDs 190.

Figure 7:
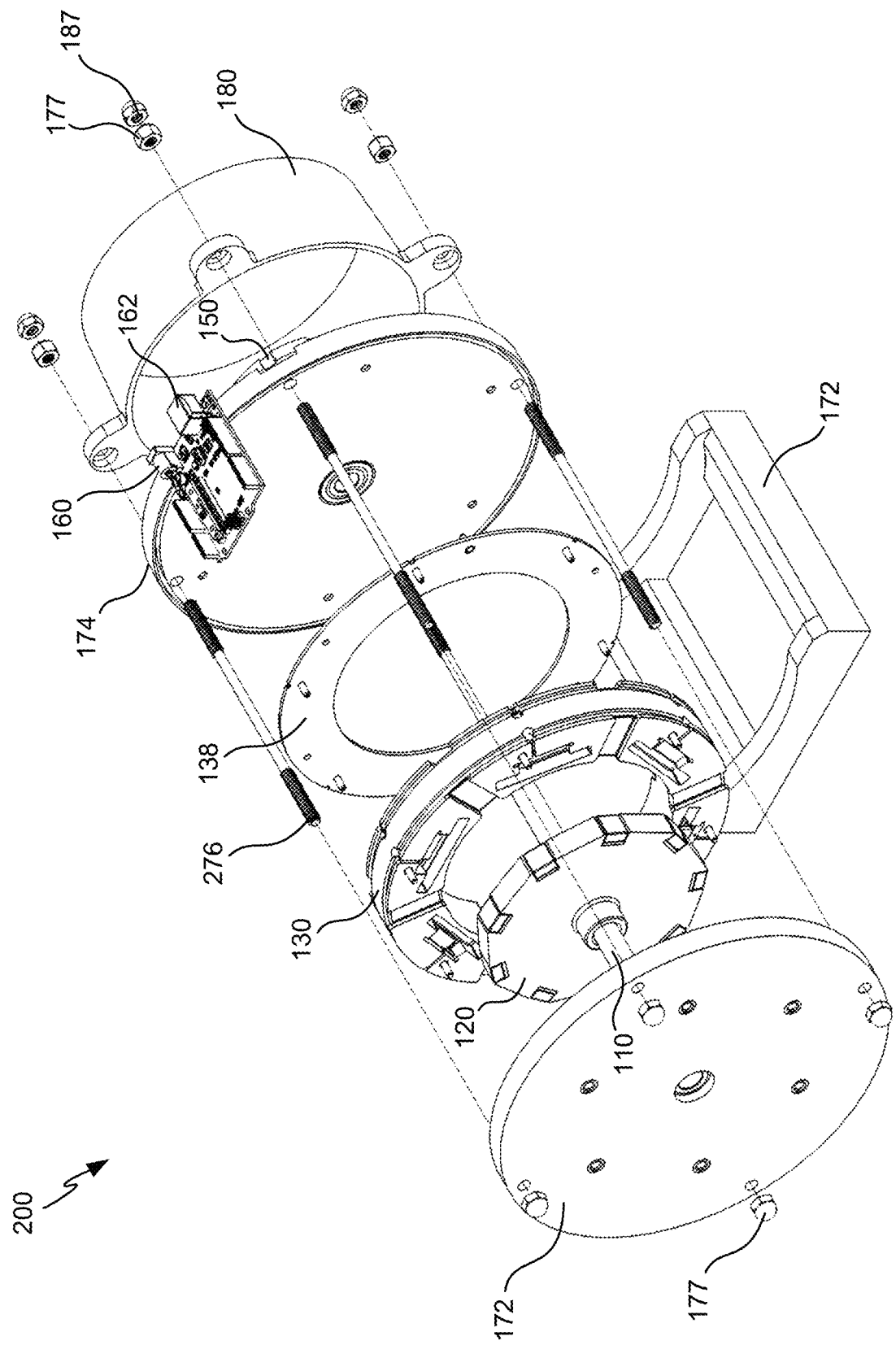
FIG. 7 illustrates the modular electric motor of FIGS. 1A-1D, but configured with only a single stator and single rotor.

Electric motor 100 includes a modular design in that the rotors 120 in the rotor stack and the stators 130 in the stator stack operate in parallel and are selectively removable to modify the size and power of the electric motor 100. The modular design allows as few as one rotor 120 and one stator 130, as shown with respect to electric motor 200 (FIG. 7). However, in the specific configuration of electric motor 100, electric motor 100 includes a plurality of rotors 120 and a plurality of stators 130 in a stack configuration. Each of the rotors 120 is configured to rotate about the central shaft 110. Each rotor 120 in the stack is substantially similar to each other, and each stator 130 in the stack is substantially similar to each other. For example, each rotor 120 include rotor permanent magnets 122 as previously described and each stator 130 includes stator permanent magnets 132 and MIDs 190 as previously described.

Electric motor 100 further includes a cylindrical housing 170 encasing the stator 130 and the rotor 120. Front plate 172 covers a first side of the cylindrical housing 170, and end plate 174 covers the other side of cylindrical housing 170. Front plate 172 and end plate 174 are secured with threaded compression bolts 176 and nuts 177. Central shaft 110 extends through both front plate 172 and end plate 174. The side of central shaft 110 extending through the front plate 172 is the drive portion of the shaft. Meanwhile, timing hubs 150 are mounted to the side of central shaft 110 extending through the end plate 174. Timing cover 180 is secured with nuts 187 over timing hubs 150.

Timing hubs 150 are each aligned with a set of rotors 120 to provide position information to the controllers 160 for each chamber of electric motor 100. In the present example, electric motor 100 includes two chambers, each with two rotors 120 and two stators 130. Other examples may include as few as one chamber or more chambers. Motors of this type can have more or less magnets per chamber, be rotational or linear, and be configured in shapes other than round. Each of these possible modular configurations can be modified to meet a specific power need for the eventual application by adding or reducing the number of chambers. When configured with the zero reference point of each chamber in alignment, the torque of the motor configuration will increase and the rpms will decrease for a given controller signal. In comparison, with each chamber rotated a number of degrees from the previous chamber the torque will decrease for a given controller signal and the RPMs will increase. In this manner, changing the relative alignment of the chambers alters the characteristics of the motor.

Controllers 160 include sensors 162, such as hall-effect sensors to detect position information from timing hubs 150. Controllers 160 are mounted in control case 182 on the outer surface of motor housing 170. Motor housing 170 includes an aperture to allow the sensors 162 of controllers 160 to interact with timing hubs 150. Cover 183 encloses control case 182, although vent holes allow passive cooling of control components. For example, airflow to cool the controllers 160 may be naturally driven by the rotation of rotors 120 within housing 170.

The rotors 120 in each chamber are aligned with each other, whereas the rotors 120 in the other chamber are offset. As shown in FIG. 2, rotors 120A correspond to the first chamber, whereas rotors 120B correspond to the second chamber. As shown in FIG. 3, stators 130A correspond to the first chamber, whereas stators 130B correspond to the second chamber. The offset of rotors 120 is set by the orientation of rotors 120A vs 120B on keyed shaft 110. The offset of stators 130 is set by the pins 139 in offset plate 138 (FIG. 3) of the stator stack engaged with alignment holes 137 of the adjacent stators 130.

Offsetting rotors 120 in the rotor stack smooths the torque output of motor 100 compared to an alternative configuration where all rotors 120 are in alignment. However, it adds additional complexity for control as the positions of each chamber must be known to operate the motor. Details regarding the control of electric motor are discussed further with respect to FIGS. 4A, 4B and 5.

Figure 4A:
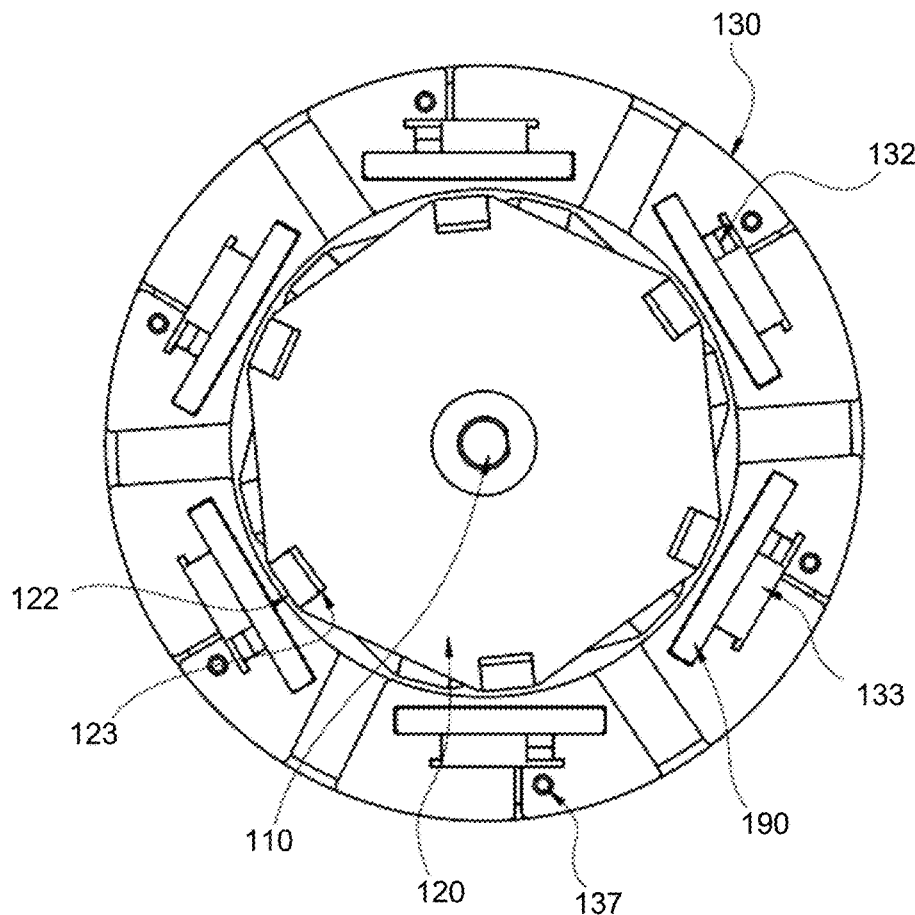
FIGS. 4A and 4B illustrate side views of stator-rotor pair of the electric motor of FIGS. 1A-1D.
Figure 4B:
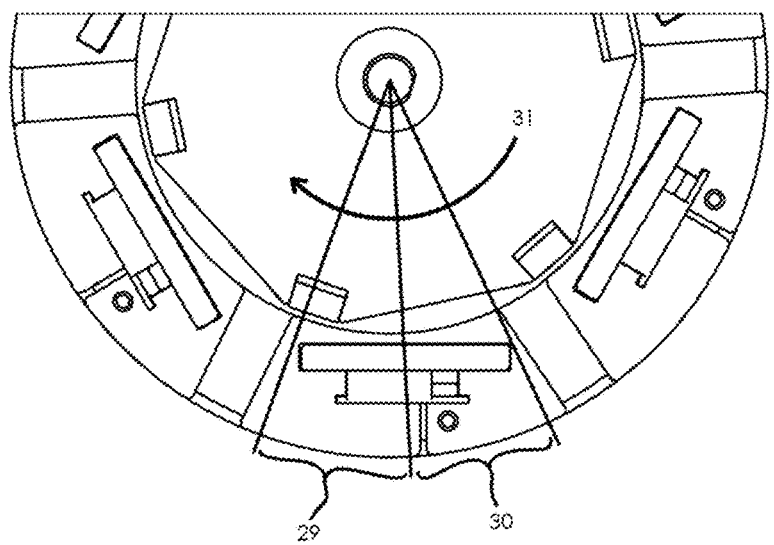

FIGS. 4A and 4B illustrate side views of a stator 130-rotor 120 pair of electric motor 100. Timing is important for the operation of motor 100 to allow motor 100 to run. MIDs 190 must turn on to allow rotor magnets 122 to rotate towards stator magnets 132. In FIG. 4A rotor magnet 122 just entering the "on zone 30". This is the zone where the timing hub magnet tells the Hall Effect sensor to send a signal to the computer to turn on the relay which will send power to the MIDs 190 creating the void. This allows the rotor 120 to move through the negative torque (or backlash) of the stator magnet 132. The time duration is a preset in the control system of the motor control or the algorithm that would change the timing on-the-fly. FIG. 4B shows the rotor magnet 122 in the acceleration portion of the stator magnet 132 (or "torque zone 29"). This is when the MIDs 190 are turned off and no power is sent from the motor control. The acceleration portion (or "torque zone 29") is slightly larger than the "on zone 30". Finally, timing can be fine-tuned by advancing or retarding the timing hubs in correlation with the motor control "time on" (or "on Zone") for the end-user's desirable application. With an encoder, the computer may count timing dots. This can be any number of dots, such as but not limited to, 360 dots per rotation, 900 dots per rotation, 14,000 dots per rotation, etc. The number of dots may depend on computing power and timing resolution.

Figure 5:
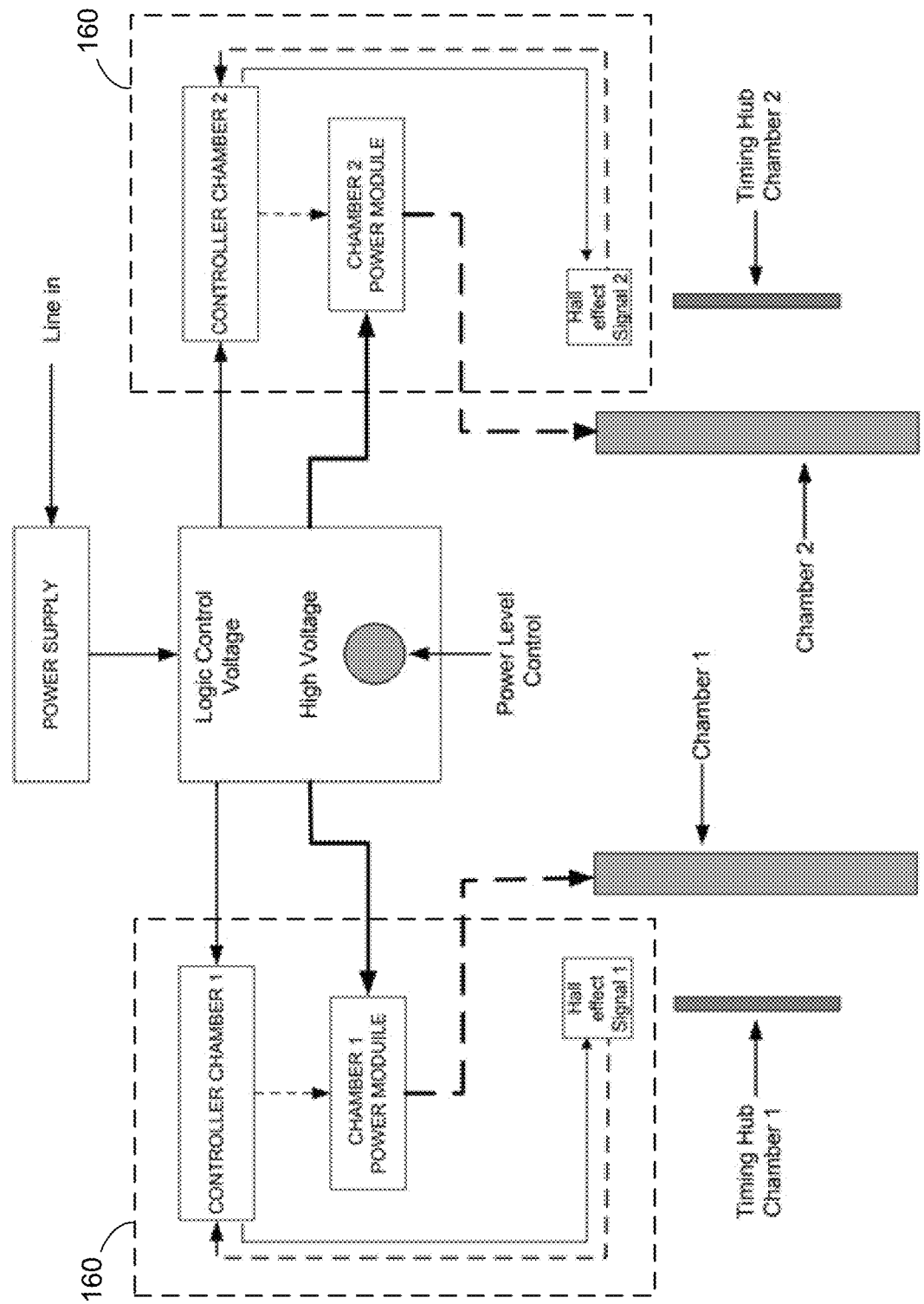
FIG. 5 is a conceptual diagram of a control system for operating the electric motor of FIGS. 1A-1D.

FIG. 5 is a conceptual diagram of a control system for operating the electric motor 100. Controller 160 configured to issue control signals to the MIDs 190 to operate the electric motor 100. The control signals to the MIDs 190 mitigate magnetic backlash or negative torque as the rotor permanent magnets 122 enter the magnetic fields of the stator permanent magnets 132. In some examples, MID electric fields function to mitigate magnetic backlash or negative torque as the rotor permanent magnets 122 enter the magnetic fields of the stator permanent magnets 132 and further to pull the rotor permanent magnets 122 into the magnetic fields of the stator permanent magnets 132.

The controller 160 is further configured to receive position signal information corresponding to a rotational position of the rotor 120 and issue the control signals to the MIDs 190 based on the position signal information. Electric motor 100 may further include one or more sensors configured to output the position signal information corresponding to the rotational position of the rotor 120. In some examples, the one or more sensors may include a hall-effect sensor. For example, the sensors may detect the rotational position of rotor chambers by detecting magnetic fields of magnets on timing hubs 150. The magnets of timing hubs 150 may align with the rotor chambers.

The controller 160 is further configured to receive control inputs issue the control signals to the MIDs 190 based on the control inputs. The control inputs may include speed or torque settings.

Electric motor 100 provides a number of advantages. For example, motor 100 may be twenty to thirty percent lighter than conventional motors, due to the low heat production of the MIDs 190 and low duty cycle of the magnetic interruption. The overall temperature of the electric motor 100 will remain relatively cool. In some examples, due to low heat generation, cheaper and higher thermally insulative materials may be used. For example, the electric motor may include of biodegradable plastics or other sustainable and renewable materials (greatly reducing manufacturing and salvage costs) which in turn would lead to a much lighter motor.

The modularity of motor 100 allows stacking chambers together to increase torque or RPM. This allows different size motors using common components.

Control systems for motor 100 may vary speed and horsepower by simply adjusting timing to MIDs 190. This may save energy compared to conventional motors that require inefficient voltage control to reduce speed.

In the same or different examples, the control system may be pre-programmed to specific set points rpm torque specific to a user's needs.

The advanced control of motor 100 provides an ability to change torque and RPM without affecting horsepower. Equation for horsepower is RPM times torque divided by 5252 equals horsepower. Motor 100 can be configured to increase torque and reduce RPMs and still maintain the same horsepower. And motor 100 can be set to increase RPMs and decrease torque which will maintain the same horsepower. In contrast, conventional motors can't increase torque, so lower RPM means lower HP. Specifically, with motor 100, the controller can increase torque at lower RPM by increasing duration of MID 190, diminishing backlash even more, this reduces RPM and increases torque. The controller can also increase current through MID 190 to increase force.

For example, MIDs 190 can be used to create the void in the stator 130 magnetic field allowing the rotor magnet 122 to enter the field without experiencing magnetic backlash or negative torque. The MID 190 also creates a magnetic field that will pull the rotor magnet 122 into this voided field.

The configurability of motor 100 facilitates advanced control algorithms. For example, the controller can set power pulses to MID 190 in first polar orientation mode magnet configuration of motor to produce constant horsepower at various speeds and related constant power with very low heat. The controller can also output constant power at different RPMs. The controller can operate to limit heat production, e.g., by reducing the on time of the MIDs. The controller can also vary torque output per revolution.

The controller may also be programmed to operate the motor using an external control pad or imbedded code or specific application through imbedded code or external control pad or control system. For example, the user may use a control pad to set RPM, torque, limit temperatures etc.

In some examples, due to low heat generated during operation, one or more of housing 170, front plate 172, end plate 174, rotor frame 124, and stator frame 134 may be formed from any material that is not affected by magnetic fields, such as but not limited to, a non-ferrous material, such as a polymer, polycarbonate material, a nonferrous metal, such as an aluminum or titanium material, or composite material, such as carbon fiber. In this manner, the construction materials can vary widely and are not limited to classical motor construction constraints.

Figure 6A:
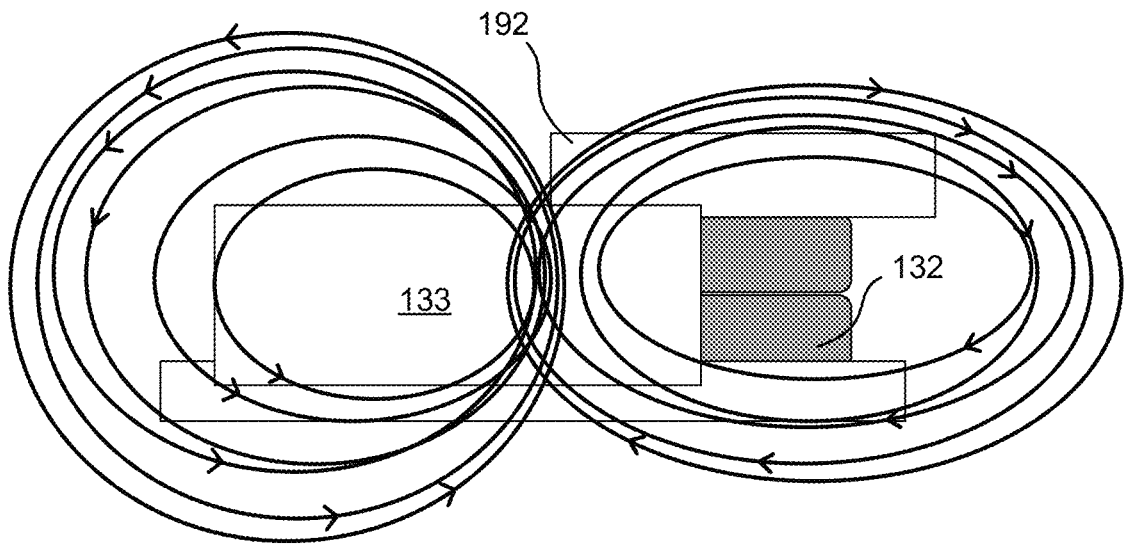
Figure 6B:
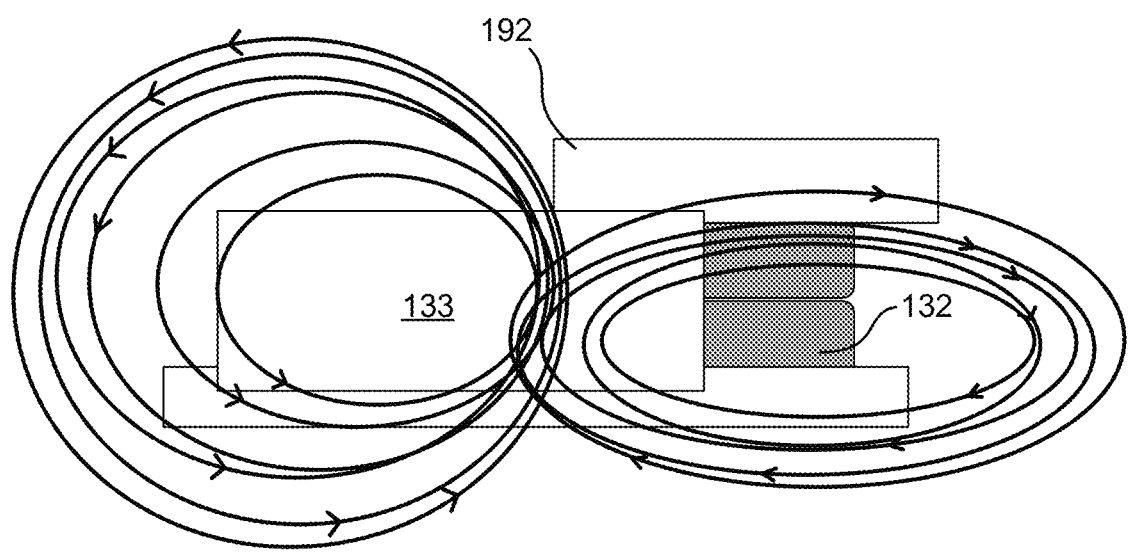

FIGS. 6A and 6B illustrate magnetic fields of adjacent permanent magnets in the stator-rotor pair of the electric motor 100 with a soundwave MID off and on. MIDs 192 each include a soundwave device that disrupts a magnetic field of the corresponding stator permanent magnet 132. Any material or device that allows the atoms of a magnetic field to line up and allows the electron or other subatomic particle(s) to spin (such as spaced copper plates, copper wire without a core of iron or ferrite, or a graphite sheets with copper or superconductive material) may be used as a part of a MID. In an example, a soundwave device may produce sound waves that can cause the movement of the atoms which can in turn, disrupt a magnetic field. In general, magnetic fields cannot be blocked but they can be diverted to create a void. Much like the bow of the ship moving the water out and away, the MID 190/192 moves the magnetic field out and around the MID.

FIG. 7 illustrates electric motor 200. Electric motor 200 is the same as the modular electric motor of 100, but configured with only a single stator 130 and single rotor 120. In addition, compression rods 276 and cylindrical housing (not shown) may be sized to conform to the single rotor-stator configuration.

Figure 8A:
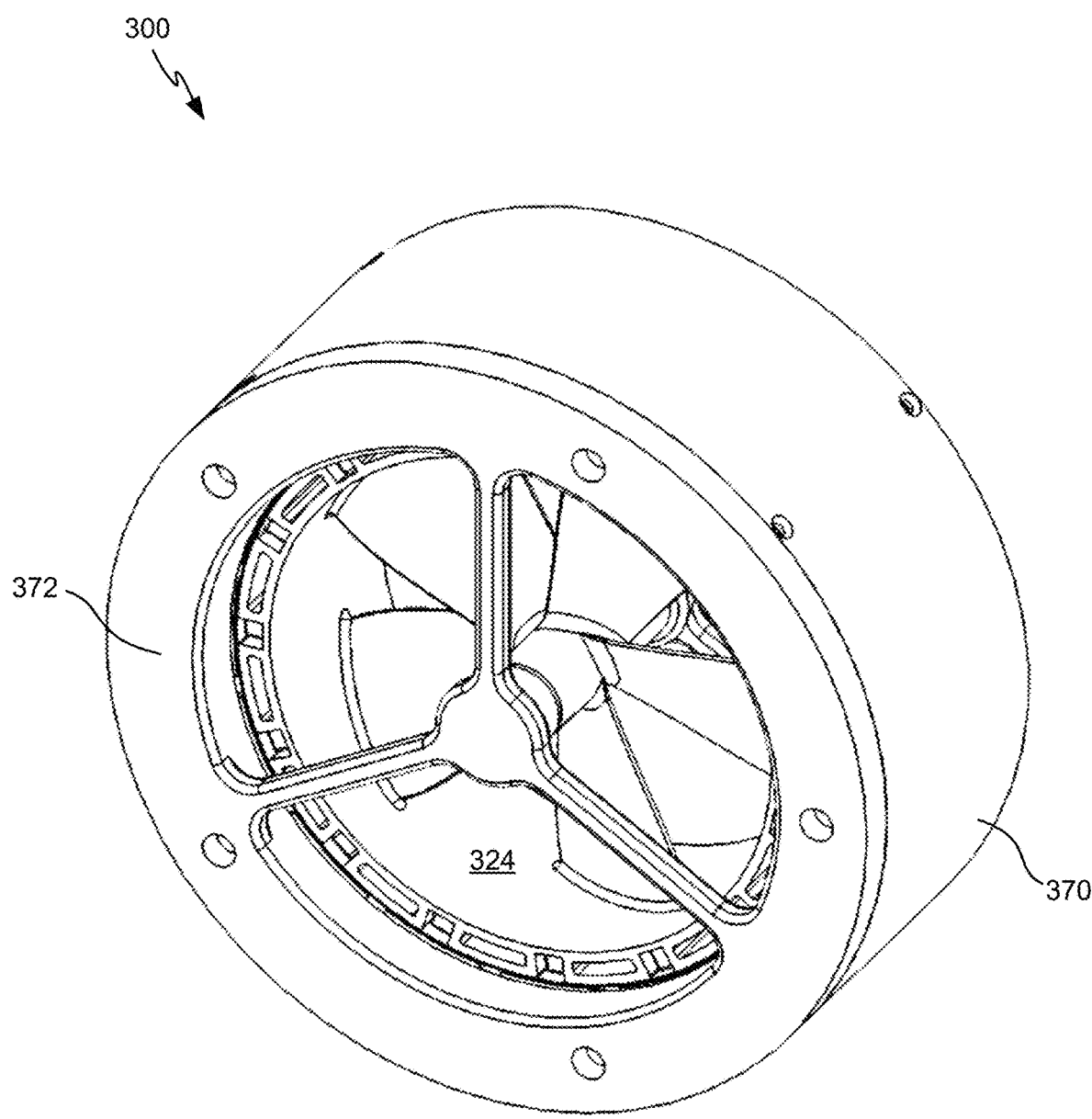
FIGS. 8A-8C illustrates an alternative to the electric motor of FIGS. 1A-1D with fan blades integrated with a set of rotors.
Figure 8B:
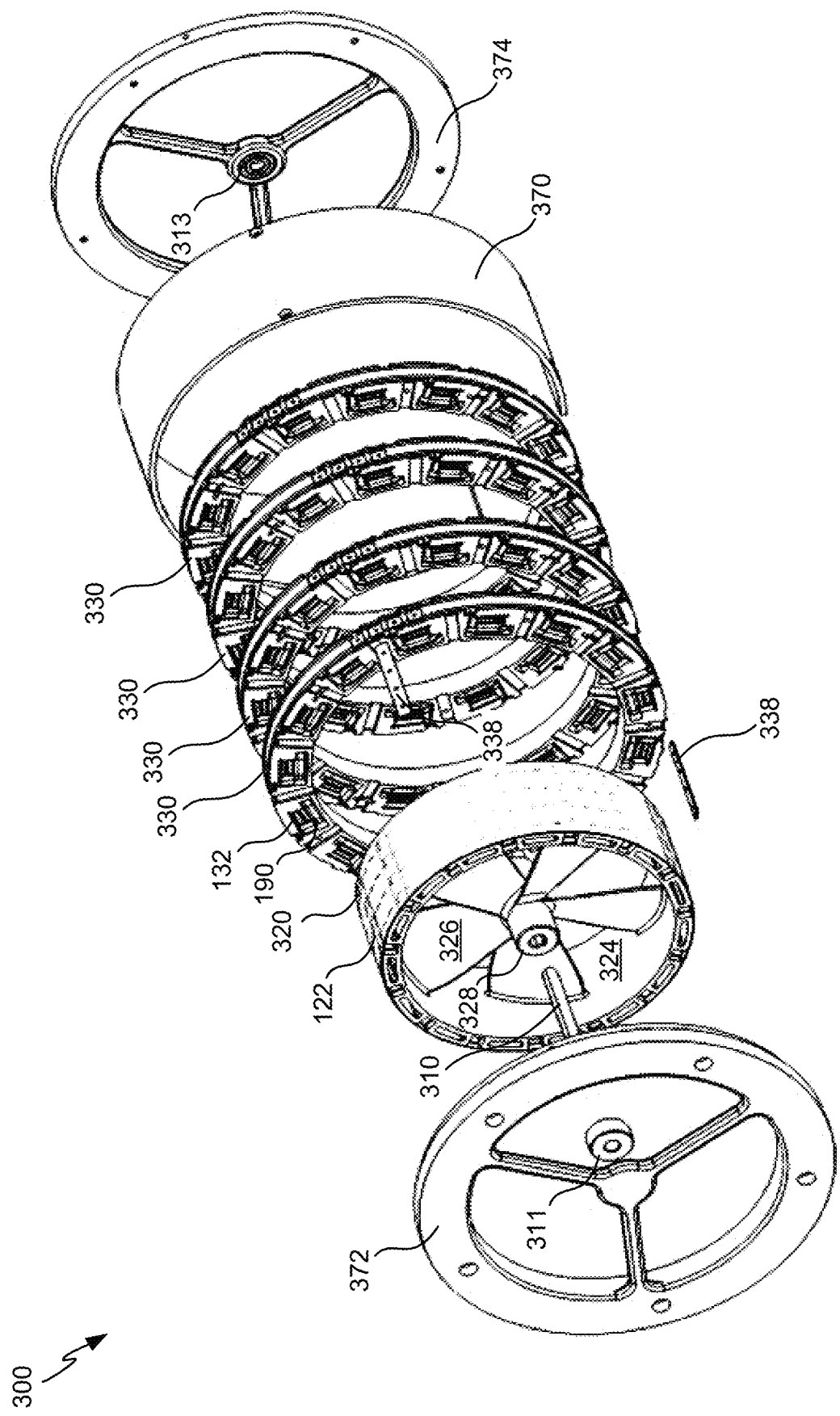
Figure 8C:
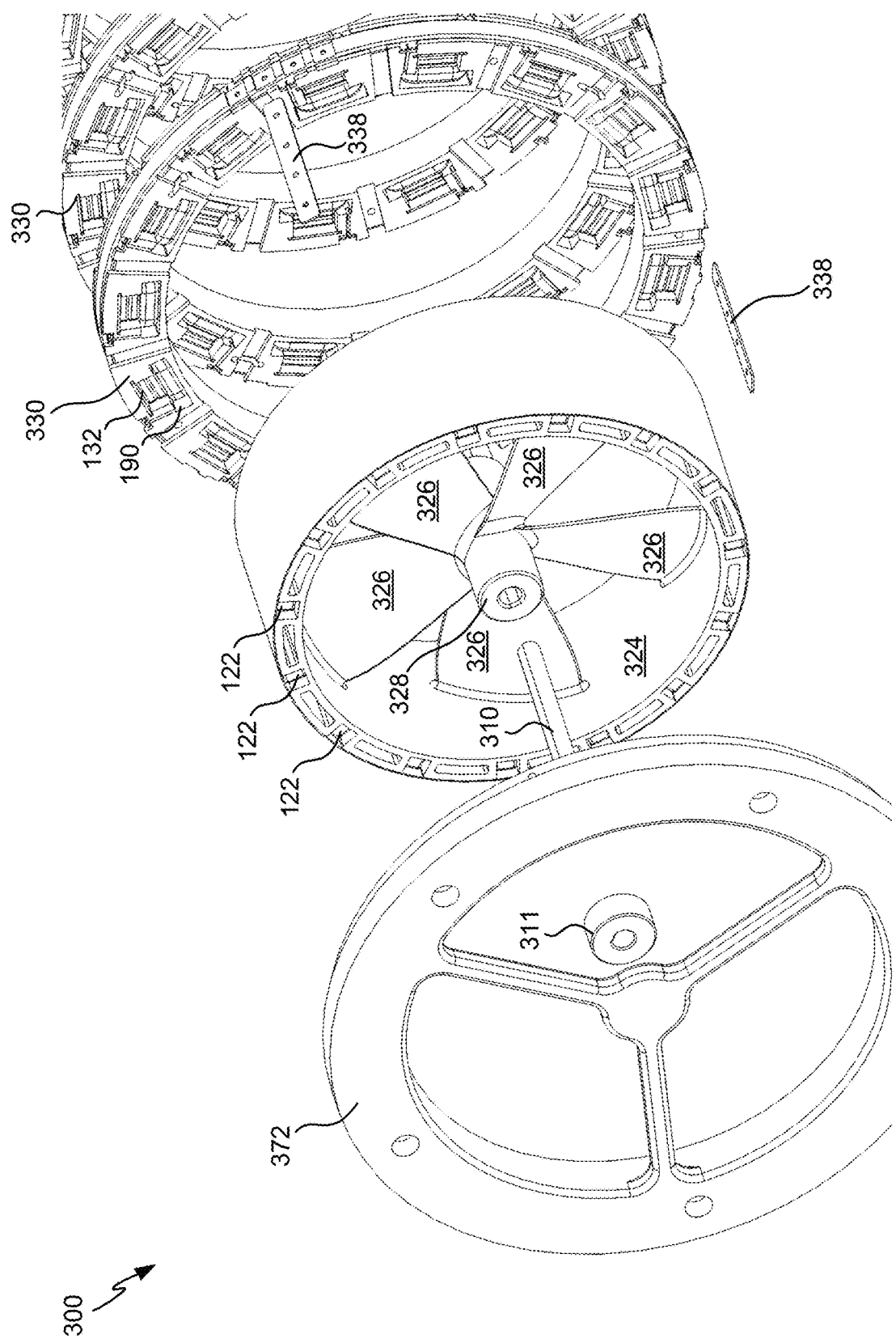

FIGS. 8A-8C illustrates an alternative motor 300 to the electric motor 100. Motor 300 includes plurality of fan blades 326 between the rotor permanent magnets 122 and the central shaft 310.

The rotor 320 further includes a rotor frame 324, wherein the rotor frame 324 includes a keyed central aperture engaged with the central shaft 110, and a plurality of slots configured to hold the plurality of rotor permanent magnets 122 arranged in a first polar orientation. Rotor frame 324 includes slots for rotor permanent magnets 122 corresponding to four stator rings 330. Rotor 320 includes rotor permanent magnets 122 corresponding to four stator rings 330. Alignment plates 338 set the relative alignment of different chambers of stators 330.

The housing of motor 300 includes cylindrical housing 370 with a front plate 372 and rear cover 374. Rotor frame includes a shaped hub 328 for engaging keyed shaft 310. A front main bearing 311 supports shaft 110 at front plate 372 whereas rear main bearing 313 supports shaft 110 at rear cover 374.

Positioning sensing and control (not shown) are the same as described with respect to motor 100.

The way the rotor 120/320 is designed with the magnets 122 on the very peripheral of the rotor wheel it allows us to use the center space to incorporate built-in applications. Such as a family of fan blades; this design, however, is not limited to fan blades. The center of the hubs could be an Archimedes screw which could move sand or heavy material, also a design to pump water, or as a water propulsion system. In such examples, the motor becomes the application; there will be a better laminate flow through the center without an additional motor in the center restricting the flow. The design has no real size restriction other than material limitations. This family of motor application facilitates new generation of motor application platforms.

Proof-of-Concept Motor

The inventor successfully tested working electric motors conforming to the details of electric motor 100 as described herein. The proof-of-concept motor included rare earth magnets 122, 132. It demonstrated a number of advantages over conventional motors. For example, MIDs 190 ran unexpectedly cool, even under load. In addition, the amperage was a steady-state or nonlinear or non-proportional to load. In other words, amperage did not increase or increased less due to the load factor. The inventor speculates this happened because the interaction between the natural magnets 122, 132 creates the torque, not the electric power to MIDs 190.

Changing the interval, the MID 190 are on, changed the dynamics of the motor itself. With an MID 190 time of 4 milliseconds, or with the encoder changing the number of timing dots by increasing, then the base line rpm was 900 and torque was increased. With an MID 190 time on of 2 milliseconds, the base line rpm was 1800 and torque was decreased. With an MID 190 time of 1 millisecond, or with the encoder changing the number of timing dots by decreasing, then the base line rpm was 3200 and torque was decreased even more. The results demonstrated that increasing the amount of time on of the MID 190 torque increases and the speed decreases. Conversely, decrease the amount of time the MID 190 is on and, torque decreases and speed increases.

MID 190 time could be changes while the motor was running, thus changing the motor profile on-the-fly. Such an operation can be suitable in any number of applications. For example, if the motor was in a car it could provide a lower speed and increased torque during initial accelerations then change the motor profile by changing the amount of time the MID 190 was on, which would increase speed and lower the torque keeping a constant horsepower throughout the different speed changes.

In addition, without conventional wound coils on the rotor 120 or stator 130, the failure rate of the electric motor 100 is greatly diminished as compared with conventional motors, due to a lack of overheating or stalling. In case of a catastrophic failure (i.e. gearbox, transmission, or water pump failure) the electric motor 100 has a built-in over torque clutch if resistance exceeds the magnetic coupling between the rotor magnets 122 and the stator magnets 132. In case of a severe over torque, the magnetic field between the rotor and the stator would simply collapse and no longer spin. This natural built-in over torque would ensure minimal damage both to the electric motor 100 and any connected hardware. It also allows immediate restart as no additional sacrificial components are required.

Because of the low duty cycle of the MID 190 and because the reaction of the natural magnetic field creates the torque load, the overall temperature of the electric motor 100 will remain relatively cool. Anticipated temperature rise may only be approximately 20% of the ambient temperature. In a functioning proof of concept motor, the inventor noticed only a 15° temperature rise over the ambient temperature. In other embodiments, temperature rise may be no more than approximately 50% of the ambient temperature, no more than approximately 40% of the ambient temperature, no more than approximately 30% of the ambient temperature, or no more than approximately 20% of the ambient temperature. This will allow use of exotic materials such as poly carbonate or carbon fiber so as to reduce weight. It also allows manufacture of specialized motors using 3-D printers for example for very specialized applications. Alternatively, motors can incorporate injection molded parts, dramatically lower the product cost compared to metal components of conventional motors.

By including interlinking rings in a stator stand and rotor stack, electric motor 100 becomes modular in design. Increasing the number of rings in the stacks increases horsepower. Decreasing the number of rings in the stack decreases horsepower. Additional modularity includes switching the number of magnets 122, 132, have in each stator ring 130 and rotor 120. Thus, a single platform provides multiple horsepower capabilities.

Definitions

VOID: This is a specific place where the magnetic field from the natural magnet is lessened or eliminated by diverting the magnetic field around the MID 190.

Magnetic Interruption Device (MID 190): Any material or device that allows the atoms of a magnetic field to line up and allows the electron or other subatomic particle(s) to spin (such as spaced copper plates, copper wire without a core of iron or ferrite, or a graphite sheets with copper or superconductive material) may be used as a part of a MID. In an example, a soundwave device may produce sound waves that can cause the movement of the atoms which can in turn, disrupt a magnetic field. In general, magnetic fields cannot be blocked but they can be diverted to create a void. Much like the bow of the ship moving the water out and away, the MID 190/192 moves the magnetic field out and around the MID 190.

The MIDs 190 can be proportional to the size of the magnets being used. In some embodiments, each MID 190 may have a same or similar length and thickness to the permanent magnets arranged on the stator, but the MIDs 190 may have a slightly larger or smaller width than the magnets. For example, in at least one embodiment, each stator magnet 132 may be a 1 inch by 0.5 inch by 0.25 inch thick neodymium magnet, and each MID 190 may be 1 inch by 0.75 inch by 0.25 inch thick. This oversizing in width may help create a cleaner void. As another example, where the stator magnets 132 used each have a length of 2 inches, a width of 1 inch, and a thickness of 0.5 inches, each MID 190 may have a length of 2 inches, a width of 1.5 inches, and a thickness of 0.5 inches. In other embodiments, MIDs 190 may differ in one or more other dimensions from the stator magnets 132. For example, the MIDs 190 may have a same or similar width and thickness to the magnets, but may have a slightly larger length. In other embodiments, the MIDs 190 may have the same dimensions as the stator magnets 132. In still other embodiments, the MIDs 190 may be sized and/or shaped differently. Also, the power requirements for the MIDs 190 may be proportional to the size and/or strength of the magnets in the stator. In particular, the larger the magnet the more power requirements of the MID 190 for creating a void. These any other examples, may be used as MIDs 190 in electric motor 100.

MID 190 ON: The amount of time that power is applied (both amperage and voltage) to the MID 190

MID 190 OFF: The amount of time that no power is sent to the MID 190

TIME ON: The amount of time in milliseconds the MID 190 is active as a rotor magnet 122 enters the magnetic field of a stator magnet 132

TIME OFF: The time when no power is sent to the MID 190

Parts and Assembly

FRONT PLATE 172: This piece is designed to carry the front main bearing 128; it also has four through holes evenly spaced for the compression bolts 176. There are also alignment pin holes 173 for the stator stack ring and a fitting groove where the outer motor cover housing 170 sits.

MOTOR SHAFT 110: The motor shaft 110 can have a D configuration or the keyway design. The diameter will depend on the horsepower and torque delivery. The motor shaft sits in the bearings in the center of the front and the end plate and it carries the rotor hubs 128. Primary duty is to carry the speed and torque.

ROTOR HUB 128: The rotor hub 128 locks onto the motor shaft 110 with a setscrew (see FIG. 2). Acceleration magnets 122 are radially arranged on the hub. The number of rotor magnets 122 may equal the number of magnets 132 in the stator (See FIG. 4A). In the experimental motor, the rotor magnets 122 for this configuration are 0.5×0.5 by 0.25 inches with a 0.125 inch thick steel plate on the hub site (see rotor hub magnet shield 123, FIG. 4A). This steel plate pushes the magnetic field upward making the side that faces the stator a stronger magnetic field. This increases the torque output of the rotor. The rotor hub magnet shield 123 adjusts the angle of attack at the point where the rotor magnet 122 comes into the field of the stator magnet 132. The angle is determined from the center of the axle to the radius of the rotor hub 128. The example motor included a 10° angle of attack. As shown in FIG. 4B, by using a 10° angle, a relatively low or minimum amount of rotor magnet 122 surface face is coming into the negative torque and a relatively high or maximum amount of surface face is in the acceleration field. With a zero angle of attack, which means the rotor magnet 122 is flat to the stator magnet 132 at the center point, i.e., a polar surface of the rotor magnet 122 is perpendicular to an axis of rotation of the rotor 120. Through testing, the inventor found better torque availability when the rotor magnet 122 is flat or parallel to the back one third of the stator magnet 132 however a 0° does work. Other suitable angles may be used as well. For example, an angle of attack may range between approximately 0 degrees and approximately 30 degrees, or between approximately 0 degrees and approximately 20 degrees, or between approximately 0 degrees and approximately 10 degrees. Moreover, other suitable magnet sizes for the rotor magnets 122 may be used as well. In some embodiments, each rotor magnet 122 may have a length that is shorter than that of each stator magnet 132. In at least one embodiment, each rotor magnet 122 may have a length that is half or approximately half that of each stator magnet 132. By providing rotor magnets 122 with a shorter length than the stator magnets 132, the stator magnets 132 may have a longer period of acceleration.

STATOR RING 130: The stator 130 Is One of the More Complicated Parts of the electric motor 100 (see FIG. 3). The outer ring may be strong and rigid and made up of a non-magnetic material. The stator may exclude material that would create any eddy currents such as aluminum or copper. The eddy currents may create a friction with the rotor magnets 122, causing the rotor 120 to slow down and lose overall efficiency. Stator magnets 132 in the test model were N48 neodymium permanent magnets. The test model included 1 inch long by 0.5 inch wide by 0.25 inch thick magnets. Other suitable magnet types and sizes may be used in other embodiments. Using smaller or larger magnets both on the rotor and stator can increase or decrease the amount of torque. This will change the horsepower. As indicated above, each stator magnet 132 may have a length that is approximately twice the length of each rotor magnet 122. This gives us a longer duration of acceleration and torque. There are nine magnets in the stator ring. The design includes an odd number of magnets to minimize harmonics of the rotor hubs. In other embodiments, another suitable number, which may be an odd or even number, of magnets may be used. Moreover, in some embodiments, the motor may have an equal number of stator magnets 132, rotor magnets 122, and MIDs 190.

STATOR MAGNETIC SHIELDS 133: Magnetic shields 133 (FIG. 4A) are used to enhance the strength of the stator magnets 132. Unlike the rotor shield 123 the stator shield encapsulates the bottom, sides, and the back with permeable steel. This also changes the magnetic field of the stator magnet 132 by increasing the duration of torque applied to the rotor magnet 122 itself.

Magnetic Interruption Device (MID 190): An MID 190 can be used to create the void in the stator 130 magnetic field allowing the rotor magnet 122 to enter the field without experiencing magnetic backlash or negative torque. The MID 190 creates a magnetic field that will also pull the rotor magnet 122 into this voided field. This is done by applying either DC or AC power to the MID 190 at the proper time. Magnetic fields cannot be blocked but they can be diverted, pushed down and around. (See FIGS. 6A and 6B) The stronger the magnetic field the more amperage and voltage needs to be applied to the MIDs 190 to create a void. The void becomes even larger when more power is given to the MIDs 190. The MIDs 190 of a stator ring 130 may be wired in parallel or in series so that all of them are fired at the same time, if so desired. The MIDs 190 of a stator ring and/or of an entire stator chamber may be fired simultaneously. The MIDs 190 can be placed on the top, either or both sides, or the underside of the stator magnet 132. (FIG. 6A is off, and FIG. 6B is on).

SOUNDWAVE MID 192: In an example, as described above, the MID 192 may use sound waves to disrupt the magnetic field. In an example, as illustrated in FIG. 6A, a soundwave MID 192 can be located on the side forward of the stator magnet 132 (e.g., the front side of the stator magnet 132). When the soundwave modulator is activated, turned on, or the like, sound waves can move across the path of the magnetic field and disrupt, distort, divert, or the like, the field. When the soundwave modulator is deactivated, turned-off, or the like, the magnetic field can re-coalesce, return, or the like, to its natural field or natural state. It is understood that the soundwave MID 192 may be located relative to the stator magnet 132 in other locations or configurations than just the front side, or that more than one soundwave MID 192 may be utilized depending on how the magnetic field is to be disrupted or diverted.

MAGNETIC VOID: A magnetic void is created by sending electrical charge either AC or DC to the MID 190. This in return develops an electrical field similar to a Faraday cage. For example, with copper plates for the MIDs 190, the plates may be separated from one another with an insulator. Each plate is then connected individually in parallel with a positive and negative. This creates electrical field between each plate similar to a capacitor. The idea is to create an electrical field between each plate to interrupt the magnetic field of the stator magnet 132. Residual electrical field between the plates of the MID 190 are undesirable, so the plates are not encapsulated in some embodiments. Moreover, the MIDs 190 may be constructed and configured such that the electrical field is formed and dissipate within 2 ms, 1.5 ms, 1 ms, or 0.5 ms or within another relatively short period of time. In an example, much shorter or much longer periods of time may be used to take advantage of the electric motor 100's characteristics, configurations, or the like.

Additionally, or alternatively, the MID 190 may include copper wire woven as a mesh, as a coil, or the like. This creates both electrical and magnetic fields which may dissipate over a period of time. (See, e.g. FIGS. 6A and 6B). In other embodiments, the MIDs 190 may be constructed using other suitable metals and/or other suitable materials.

ALIGNMENT PINS: Alignment pins and are put into place both for alignment and structural strength between stator rings 130 and/or front plate 172 and end plate 174 (See FIG. 1D).

MAGNETIC HOLE: A magnetic hole is where the attraction assist permanent magnet is located. In this configuration where using a 1 inch long by 0.25 inch width and 0.125 inch thick N42 neodymium permanent magnet (See FIG. 4A), although other suitable magnet types and sizes may be used as well. Each stator ring may have one or more magnetic holes configured for receiving one or more attraction assist magnets. Magnetic holes may be evenly spaced about a stator ring. In some embodiments, a number of magnetic holes may equal a number of stator magnets 132 arranged on the stator ring. Every stator magnet 132 may have an assist magnet to help pull the rotor magnet 122 into the next cycle.

STATOR RING CHAMBER: The stator ring chamber can include one or more, or two or more, stator rings 130 in parallel with one another by means of the compression bolts 176 serving as alignment pins (FIG. 1D).

TORQUE AND OFFSET PLATE 138: A torque/offset plate may be used to offset one stator chamber from another. The torque plate is made up of a non-magnetic stainless steel or other non-magnetic material configured to avoid any eddy currents. On one side of the plate is a set of standard alignment pins 139 for the stator and on the other side would be a set of offset alignment pins 139 for the second chamber of the stator rings. An example: 360 divided by 9 magnets is 40° so every magnet in the stator ring is set 40° from one another. The offset pins of the plate would be set at 20° offset so one ring chamber would be set 20° off from the other. For example, with three stator ring chambers, each set of chambers would be set at 13.33° off from one another.

STATOR RING ASSEMBLY: The stator ring assembly may include the stator ring chambers, each having a suitable number of stator rings 130. The stator ring assembly may additionally include a torque and offset plate 138 arranged between adjacent chambers (FIG. 3).

COMPRESSION BOLTS 176: In an example, multiple compression bolts 176 can be used to connect the front plate 172 and the end plate 174. In an example, there may be four compression bolts whose purpose is to pull the front plate 172 and the end plate 174 together compressing the stator rings 130 and to hold the alignment pins together (See FIG. 1D).

MOTOR OUTER COVER HOUSING 170: An outer cover housing 170 is located between the front plate 172 and the end plate 174 and fits into the groove of both to help prevent particle saturation. In an example, the outer cover can house, contain, or the like, the wiring and computers (See FIG. 1B).

MOTOR CONTROLS 160: In an example, a pair of Adriano control boards (or another similar control board) can be used to control the motor. One or multiple micro controllers will control a stator chamber or multiple chambers. Each micro controller or input/output pair can be used to read the input signal, make appropriate decisions, advance or delay signals, determine length of on and off times—and send command signals to the motor MIDs 190 thereby controlling the motor dynamics. (See FIG. 5).

TIMING HUBS 150: In an example, the timing hubs will have a compression fit on the main shaft 110. This will allow for manual fine-tuning of the electric motor 100. On the timing hub there will be the exact number of smaller magnets and degree of position as a stator ring 130. So, the stators 130 and the timing hub 150 each have nine magnets at 20°. In addition, if there is a second stator chamber, there will there be a second timing hub 150 with the exact offset and so on. The purpose of the timing hub magnets is to send a timing hit to the Hall Effect sensor one sensor per hub. This will allow the computer to know when to power the MID 190. Alternatively, or additionally, an encoder or other timing device may be attached, and may replace the timing hubs and hall affect devices to accomplish a further refinement in motor timing.

COMPUTER CONTROL: The computer/microcontroller or the like will be connected to an input timing device such as a timing hub, hall effect sensor, encoder etc., and will manipulate the timing and sequence driving the motor components, thereby changing the dynamics of the motor—as described in above. The computer will be connected to the timing hub this timing hub will tell what chamber to fire through set of algorithms algorithm changed the time on and off the MID 190 which will change the dynamics of the motor itself explained in the MID 190 portion of this patent.

TIMING HUB COVER 180: protection to the timing hubs, encoder, Hall effect or other timing components.

Operation

REPULSIVE CONFIGURATION: The magnets on the rotor hub are arranged to repel magnets on the stator hub. In other words, opposites attract while the same repel. So, in the electric motor 100 magnetic configuration, magnets would be set up north facing on the stators 130 and north facing on the rotor 120. Or magnets may be south facing on stators 130 and south facing on the rotors 120.

POWER AND ELECTRICAL SYSTEM: The proof-of concept motor utilized DC power, although other example MIDs 190 may operate on AC power. The main power used to power the motor can be from a DC battery or an AC outlet that is converted to DC. Main power is sent to a relay to power to the control system and MID 190s. The control system picks up a signal from the Hall Effect sensor, or encoder, absolute encoder, or other timing device, when the timing hub magnet enters in its field. There is one sensor per timing hub. The computer then sends a signal to the relay allowing the power to go to the stator or stator chamber. This activates the MIDs 190 that are in parallel so that all the MIDs 190 activate at the same time per chamber. The control system then turns off the power to the MIDs 190 after a predetermined amount of time. The same process happens with the second chamber as with the first chamber. If there is a three-chamber system, chamber 1 would fire, then chamber 2, then chamber 3, and then repeat. As discussed previously, electric motor 100 is depicted with two chambers.

TIME DURATION: Time is relevant to the electric motor 100 as explained before in the description the MID 190's 190 function to divert the magnetic field creating the void from the stator magnet 132. This is done by bending the magnetic field around the MIDs 190 through electrical pulses. The longer the MIDs 190 are on, the more the magnetic void becomes defined. The motor control will tell the relay how long to stay on and when to shut off. As the void becomes more defined, there is less magnetic resistance coming into the field from the rotor magnet 122 allowing the rotor to experience more torque to the shaft 110. However, the longer the MID 190 is in the on, the more Eddy currents develop thus slowing the rotor 120. Too much time on and the motor will slow to a point where it does not work properly, thus there is a delicate balance between torque, speed, and time. Based on this time duration, the electric motor 100 can become a one horsepower motor at 900 RPM (6 foot-pounds multiplied by 900 rpm's divided by 5252 is equal to one horsepower). By shortening the amount of time the MIDs 190 are on, the electric motor 100 can go to 1800 RPM motor at one horsepower (3 foot-pounds of torque multiplied by 1800 rpm's divided by 5252 is equal to one horsepower). By shortening the time MIDs 190 are on even more or roughly cutting the time in half, the electric motor 100 can go to 3600 rpm's motor at one horsepower (1.5 foot-pounds of torque multiplied by 3600 rpm's divided by 5252 equals one horsepower). In this manner, the horsepower can be set configured to match a set amount by setting the corresponding time for MIDs 190.

TIMING OF THE ELECTRIC MOTOR 100: Timing is important for the operation of motor 100 to allow motor 100 to run. MIDs 190 must turn on to allow rotor magnets 122 to rotate towards stator magnets 132. In FIG. 4A rotor magnet 122 just entering the "on zone 30". This is the zone where the timing hub magnet tells the Hall Effect sensor to send a signal to the computer to turn on the relay which will send power to the MIDs 190 creating the void. This allows the rotor 120 to move through the negative torque (or backlash) of the stator magnet 132. The time duration is a preset in the control system of the motor control or the algorithm that would change the timing on-the-fly. FIG. 4B shows the rotor magnet 122 in the acceleration portion of the stator magnet 132 (or "torque zone 29"). This is when the MIDs 190 are turned off and no power is sent from the motor control, the acceleration portion (or "torque zone 29") is slightly larger than the "on zone 30". Finally, timing can be fine-tuned by advancing or retarding the timing hubs in correlation with the motor control "time on" (or "on Zone") for the end-user's desirable application. With an encoder, the computer may count timing dots. This can be any number of dots, such as but not limited to, 360 dots per rotation, 900 dots per rotation, 14,000 dots per rotation, etc. The number of dots may depend on computing power and timing resolution.

POWER CONSUMPTION: The power requirements of the MIDs 190 to create the void is the only power requirements for the electric motor 100. The larger the magnets become, both on the stator and rotor, the larger the amperage and voltage needs to become. However, because the electric motor 100 does not require any coils to produce the torque or speed, the electric motor 100 becomes a steady-state amperage motor. In other words, the electric motor 100 relies on the MIDs 190 to create the magnetic void, the interaction between the rotor magnets 122 and the stator magnets 132 creates the speed and torque of the rotor that pushes it to the next stator magnet 132, and the cycle begins again.

The application of resistance to shaft 110 pushes rotor magnets 122 further back into the acceleration chamber or torque chamber. Over torque the electric motor 100, push the rotor magnet 122 back into the "on zone" of the MIDs 190, activation of MIDs 190 would create a magnetic void and reverse the creation of the void would collapse the magnetic field and the motor would stop running. Because the MIDs 190 are not on or consuming power when the rotor is in the acceleration torque field, the amount of wasted heat from the MIDs 190 is minimal. Also, the MIDs 190 are designed for the voltage and amperage needed to create the void, thus the heat loss is minimal. Considering that the MID 190's duty cycle is only approximately 45% of rotation in some embodiments, it makes a relatively cool running electrical motor. Somewhat like a standard electrical motor, electrical power goes in and manual speed and torque is produced. Efficiency of the motor is reliant upon the amount of energy it takes the MIDs 190 to produce its void and the mechanical speed and torque it produces. In addition, motor operation also take advantage of pulses of energy generated as the rotating magnets pass into and out of the MID 190 regions, further increasing efficiency, reducing I^2R losses and related heating.

ATTRACTION ASSIST PERMANENT MAGNET: The "assist magnet" has a primary purpose to pull the rotor in towards the MIDs 190. This will help facilitate a smoother start-up. Because the stator magnets 132 and rotor magnet 122 are in repulsion, the attraction magnets are set up to pull the rotor magnets 122 in towards the MIDs 190. For example, if the rotor and stator magnets 132 are south-facing, the attraction magnets may be north-facing. Additionally, the motor may have one, or at least one, attraction assist magnet for each stator magnet 132. For example, if there are 9 stator magnets 132, there may be 9 attraction magnets arranged on the stator. (See FIG. 4A).

STATOR CHAMBER OFFSET: Stator chamber offset is done to increase the overall torque output and to smooth out the torque curve. The MIDs 190 do not pull the rotor magnet 122 into the field but create a void and that void becomes a non-torque area. Therefore, by offsetting the chambers the void areas overlap with a continuous torque field. If desired, all the rings can be set so that all the magnets are in alignment with no offset. This configuration will supply the greatest amount of start-up torque (See FIG. 1C).

DETERMINING OFFSET FOR EACH CHAMBER: To determine the number of degrees of offset for each chamber, the following process can be used:
1. 360 degrees divided by number of magnets per chamber equals the number of degrees for each magnet's placement.
2. That number is divided by the number of chambers in each motor set. This will provide the number of degrees each chamber needs to be offset from one another.

In an example, using 5 magnets per chamber and a 4 chamber motor set will yield:

360 degrees/5 magnets=72 degrees magnet placement offset 72 degrees/4 chambers=18 degrees=the offset between each chamber.

TORQUE CHANGE WITHIN A REVOLUTION: In addition to equal spacing of the magnets, it is possible to change torque per revolution. For example, the magnets may be spaced unequally which, in turn, will change the torque in a given revolution. Such a change in the torque during a revolution may have a particular advantage for certain applications/uses or for a particular load to which the motor is connected. For example, one configuration could have one spacing of 70 degrees and the next spacing of 74 degrees, and so on. A potential use of this application could be matched to a compressor or pump that needs more torque during a particular portion of each revolution and lower torque during another part of the revolution.

NUMBER OF MAGNETS PER CHAMBER: There can be any number of magnets of various size, strength, and shape in each chamber. Examples include a five magnet chamber and rotor, but any number of magnets (e.g., 1, 2, 3, 4, 5, 6, 7, 8, 9, 10, 11 . . . ) can be used. The number of magnets used can affect speed, torque, motor diameter, circumference, overall length of the motor housing, or other similar parameters. For example, motor diameter and motor circumference may be altered by varying the configurations and number of magnets per chamber. In an example, using prime numbers for the number of magnets and/or the number of chambers may provide a significant advantage during motor configuration/design for some applications, uses, or the like.

MODULAR DESIGN: by the utilization of stator rings and then by those rings becoming stator chambers, then by using the torque and the offset plate, additional stator-rotor chambers can be added to the stack. This will either increase or decrease horsepower. This allows us to use the same platform thus cutting manufacturing costs. The motor profile just becomes longer or shorter depending on the end-users need or horsepower requirement.

Figure 9A:
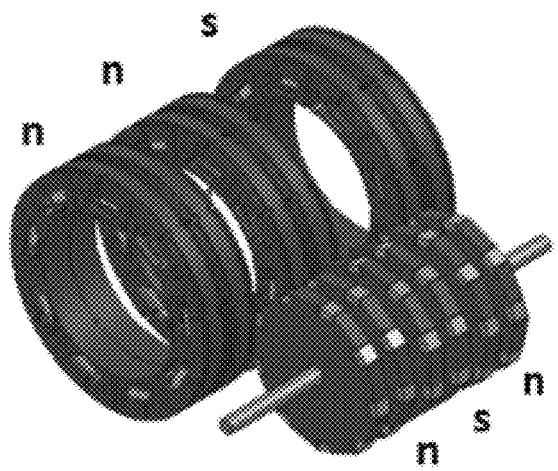
FIGS. 9A-9C illustrate example configurations of stator modules
Figure 9B:
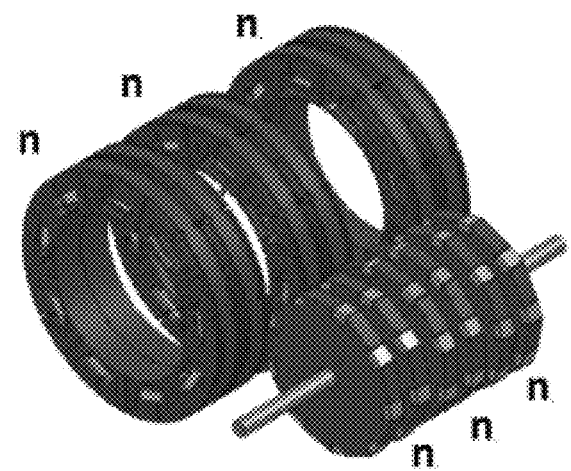
Figure 9C:
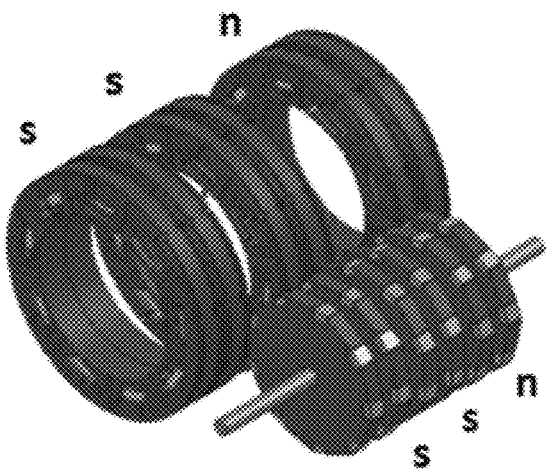

MODULAR SECTIONING OF STATOR MAGNETIC FIELDS: FIGS. 9A-9C illustrate example configurations of stator modules. In an example, when all stator modules are in the same configuration of, for example, north, and the rotor configuration is also, for example, north, as illustrated in FIG. 9B, the magnetic field between the chamber stators and the rotor operate as one linear magnetic field. Such a configuration would be considered chamber stator #1N, chamber stator #2N, chamber stator #3N, chamber stator #4N, chamber stator #nN. In such a configuration, the motor can experience the greatest amount of torque while reducing the number of RPMs.

In an example, other stator module configurations may be utilized. This can cause the dynamics of the motor to change. In a non-limiting example involving a four-chamber configuration, the chamber #1 stator and the rotor #1 hub magnets may be changed to a north facing polarity. Similarly, chamber #2 stator and rotor #2 hub magnets may be changed to a south facing polarity. Further, chamber #3 stator and rotor #3 hub magnets may be changed to a north facing polarity. And finally, chamber #4 stator and rotor #4 hub magnets may be changed to a south facing polarity. Such a "north-south-north-south" configuration can cause the motor to produce less torque but increase the number RPMs.

Depending on the application (e.g., the kind of device/load to which the motor is attached, running, operating, or the like), by configuring the magnetic pole chamber-rotor hub combination, the motor can produce high torque and lower RPMs, or low torque and higher RPMs, as desired or as necessary for a particular application. In a four-chamber configuration, such combinations may include "north-north-south-south," "north-north-north-south," "south-south-south-south," or any combinations or permutations of "north" and "south." Different numbers of stator chamber and rotor hubs may be used in conjunction with each other as desired. Each chamber can be a independent motor thus adding chambers or subtracting chambers will change over all HP and speed.

MOTOR DIRECTION: The electric motor 100 is a multidirectional system. The motor has the ability to reverse itself if the timing is advanced. The motor's rotation should primarily be in the direction of the MID 190. In an example, the motor may be configured such that the rotor rotates to cause each rotor magnet 122 to approach a MID 190-end of each stator magnet 132 before approaching a non-MID 190-end of each stator magnet 132. The rotor magnets 122 may thus approach the back-lash area of each stator magnet 132 before approaching the acceleration zone of each stator magnet 132 thus, the configuration shown in FIG. 4B may rotate clockwise. The computer control system can advance the timing through an algorithm this could be done by setting a touchpad to advance the timing for reverse. In addition, the motor direction, speed, torque, and power can be modified "on the fly" and/or within the algorithm for general purpose uses and for specific uses such as rotating a linear or rotary actuator positioning system-back and forth a specific and or variable distance.

The specific techniques for electric motors, including techniques described with respect to electric motors 100, 200, 300, are merely illustrative of the general inventive concepts included in this disclosure as defined by the following claims.

What is claimed is:

1. An electric motor comprising:
 a central shaft;
 a rotor configured to rotate about the central shaft, wherein the rotor includes a plurality of rotor permanent magnets arranged with a first polar orientation relative to the central shaft; and
 a stator arranged proximate to the rotor, wherein the stator includes:
  a plurality of stator permanent magnets arranged in a second polar orientation relative to the central shaft, wherein the plurality of stator permanent magnets are oriented to repel the rotor permanent magnets, and
  a plurality of magnetic interruption devices (MIDs) corresponding to the plurality of stator permanent magnets,
  wherein each MID includes an electromagnetic wire coil positioned adjacent the corresponding stator, and radially adjacent to the plurality of rotor permanent magnets
  wherein the electromagnetic wire coil of each MID is configured to, in response to an electric current, generate an MID electric field to counteract an electric field of the corresponding stator permanent magnet, and
  wherein the electromagnetic wire coil of each MID is without a core of iron or ferrite.

2. The electric motor of claim 1, wherein the stator is a first stator and the rotor is a first rotor, the motor further comprising:
 a second rotor configured to rotate about the central shaft, wherein the second rotor includes a second plurality of rotor permanent magnets arranged with the first polar orientation relative to the central shaft; and
 a second stator arranged proximate to the second rotor, wherein the second stator includes:
  a second plurality of stator permanent magnets arranged in the second polar orientation relative to the central shaft, wherein the second plurality of stator permanent magnets are oriented to repel the second rotor permanent magnets, and
  a second plurality of MIDs corresponding to the second plurality of stator permanent magnets.

3. The electric motor of claim 1, further comprising a housing encasing the stator and the rotor, wherein the housing is formed from a polymer material.

4. The electric motor of claim 1, wherein the stator further includes a stator frame, wherein the stator frame forms a plurality of slots configured to hold the plurality of stator permanent magnets arranged in the second polar orientation.

5. The electric motor of claim 1, wherein the rotor further includes a rotor frame, wherein the rotor frame includes a keyed central aperture engaged with the central shaft, and a plurality of slots configured to hold the plurality of rotor permanent magnets arranged in the first polar orientation.

6. The electric motor of claim 5, wherein the stator further includes a stator frame, wherein the stator frame forms a plurality of stator frame slots configured to hold the plurality of stator permanent magnets arranged in the second polar orientation, further comprising a housing encasing the stator and the rotor, wherein one or more of the housing, the rotor frame and the stator frame are formed from a material selected from a group consisting of:
  polymer;
  carbon fiber;
  aluminum; and
  titanium.

7. The electric motor of claim 1,
  wherein the rotor is one of a plurality of rotors in a rotor stack on the central shaft,
  wherein the stator is one of a plurality of stators in a stator stack corresponding to the rotor stack, and
  wherein the electric motor includes a modular design in that the rotors in the rotor stack and the stators in the stator stack operate in parallel and are selectively removable to modify a size and power of the electric motor.

8. The electric motor of claim 7, whereas the modular design facilitates multiple motor configurations with one or multiple motor chambers.

9. The electric motor of claim 1, further comprising a controller configured to issue control signals to the MIDs to operate the electric motor.

10. The electric motor of claim 9, wherein the controller is further configured to receive position signal information corresponding to a rotational position of the rotor and issue the control signals to the MIDs based on the position signal information.

11. The electric motor of claim 10, further comprising one or more sensors configured to output the position signal information corresponding to the rotational position of the rotor.

12. The electric motor of claim 11, wherein the one or more sensors include a hall-effect sensor.

13. The electric motor of claim 10, wherein the control signals to the MIDs mitigate magnetic backlash or negative torque as the rotor permanent magnets enter magnetic fields of the stator permanent magnets.

14. The electric motor of claim 13, wherein the control signals to the MIDs include a time on cycle while each of the rotor permanent magnets rotate towards the nearest stator permanent magnets, and the control signals to the MIDs include a time off cycle while each of the rotor permanent magnets rotate away from the nearest stator permanent magnets such that the nearest stator permanent magnets repel each of the rotor permanent magnets.

15. The electric motor of claim 9,
  wherein the controller is further configured to receive control inputs issue the control signals to the MIDs based on the control inputs, and
  wherein the control inputs include speed or torque settings.

16. The electric motor of claim 1,
  wherein MID electric fields function to mitigate magnetic backlash or negative torque as the rotor permanent magnets enter the magnetic fields of the stator permanent magnets and further to pull the rotor permanent magnets into the magnetic fields of the stator permanent magnets, and
  wherein, with the MID turned off, repulsive forces between the rotor magnet and the stator magnet accelerate the rotor magnet away from the stator magnet.

17. The electric motor of claim 1, wherein the plurality of stator permanent magnets and the plurality of rotor permanent magnets include rare earth magnets.

18. The electric motor of claim 1, wherein a polar surface of the rotor permanent magnets are offset in a range of 2 to 30 degrees from perpendicular to an axis of rotation of the rotors.

19. The electric motor of claim 1, wherein the rotor further includes a plurality of fan blades between the rotor permanent magnets and the central shaft.

20. The electric motor of claim 1, wherein the electromagnetic wire coil of each MID is oriented to counteract the magnetic field of the corresponding stator permanent magnet.

21. The electric motor of claim 1, wherein the electromagnetic wire coils of each MID are electrically connected in parallel with each other.

22. The electric motor of claim 1, wherein each MID is configured to form and dissipate the MID electric field within 1 millisecond (ms).

23. The electric motor of claim 1,
  wherein each of the plurality of stator permanent magnets has a length greater than its width,
  wherein the length is measured along a rotational path of the plurality of rotor permanent magnets about the central shaft, and
  wherein the width is measured perpendicular to the rotational path at the same radius as the length relative to an axis of rotation of the rotational path.

24. The electric motor of claim 1, wherein the electromagnetic wire coil of each MID forms a perimeter of an area covering a profile of the corresponding stator permanent magnet relative to the plurality of rotor permanent magnets.

25. The electric motor of claim 24, wherein the electromagnetic wire coil of each MID is oversized compared to the corresponding stator permanent magnet in that the area covered by the electromagnetic wire coil of each MID extends in front of and behind the corresponding stator permanent magnet relative to the plurality of rotor permanent magnets.

26. The electric motor of claim 25, wherein the area of the electromagnetic wire coil of each MID extends wider than the corresponding stator permanent magnet relative to the plurality of rotor permanent magnets.

27. The electric motor of claim 1, further comprising a plurality of stator magnetic shields corresponding to the plurality of stator permanent magnets, wherein each of the stator magnetic shields encapsulates its corresponding stator permanent magnets with permeable steel.

* * * * *